(12) United States Patent
Neal-Joslin

(10) Patent No.: US 10,313,349 B2
(45) Date of Patent: Jun. 4, 2019

(54) SERVICE REQUEST MODIFICATION

(71) Applicant: HEWLETT PACKARD ENTERPRISE DEVELOPMENT LP, Houston, TX (US)

(72) Inventor: Robert Raymond Neal-Joslin, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 14 days.

(21) Appl. No.: 15/327,430

(22) PCT Filed: Jul. 31, 2014

(86) PCT No.: PCT/US2014/049268
§ 371 (c)(1),
(2) Date: Jan. 19, 2017

(87) PCT Pub. No.: WO2016/018402
PCT Pub. Date: Feb. 4, 2016

(65) Prior Publication Data
US 2017/0187716 A1 Jun. 29, 2017

(51) Int. Cl.
*H04L 29/06* (2006.01)
*H04L 12/64* (2006.01)
*H04L 29/08* (2006.01)

(52) U.S. Cl.
CPC .......... *H04L 63/10* (2013.01); *H04L 12/6418* (2013.01); *H04L 63/02* (2013.01);
(Continued)

(58) Field of Classification Search
CPC ......... H04L 63/10; H04L 67/32; H04L 67/02; H04L 63/0823; H04L 63/02; H04L 63/166; H04L 63/0428
See application file for complete search history.

(56) References Cited

U.S. PATENT DOCUMENTS 7,489,645 B2 * 2/2009 Simon .................. H04L 63/064
370/254
8,205,240 B2 * 6/2012 Ansari .................. G06Q 30/04
709/225

(Continued)

OTHER PUBLICATIONS

International Search Report & Written Opinion received in PCT Application No. PCT/US2014/049268, dated Apr. 15, 2015, 9 pages.
Oracle Corporation, "Sun OpenSSO Enterprise 8.0 Technical Overview," (Web Page), Nov. 12, 2008, 27 pages, available at http://docs.oracle.com/cd/E19575-01/820-3740/ggraj/index.html.

(Continued)

*Primary Examiner* — Simon P Kanaan
(74) *Attorney, Agent, or Firm* — Hewlett Packard Enterprise Patent Department

(57) ABSTRACT

Example implementations relate to providing a web service. For example, an implementation includes a gateway to receive client certificate information from the client computing device and to determine a trust state of the client computing device based on the client certificate information. The gateway is also to receive a service request from the client computing device and to modify the service request. The implementation also includes a web service logic layer to receive the modified service request including the trust state and to determine a level of service associated with the client computing device based on the modified service request.

20 Claims, 4 Drawing Sheets

(52) U.S. Cl.
CPC ...... *H04L 63/0428* (2013.01); *H04L 63/0823* (2013.01); *H04L 63/166* (2013.01); *H04L 67/02* (2013.01); *H04L 67/32* (2013.01)

(56) References Cited

U.S. PATENT DOCUMENTS

| | | | |
|---|---|---|---|
| 8,578,487 | B2 | 11/2013 | Soeder |
| 8,732,805 | B2 | 5/2014 | Kavantzas et al. |
| 2003/0105864 | A1 | 6/2003 | Mulligan et al. |
| 2004/0039672 | A1* | 2/2004 | Zivic .................. G06Q 40/06 705/36 R |
| 2005/0138065 | A1* | 6/2005 | Ciriza .................. G06Q 10/10 |
| 2005/0198154 | A1 | 9/2005 | Xie et al. |
| 2007/0094283 | A1 | 4/2007 | Fung et al. |
| 2008/0263652 | A1 | 10/2008 | McMurtry et al. |
| 2009/0132813 | A1* | 5/2009 | Schibuk ............... G06Q 20/223 713/158 |
| 2009/0196308 | A1 | 8/2009 | Pan et al. |
| 2014/0101774 | A1 | 4/2014 | Armington et al. |
| 2014/0298419 | A1* | 10/2014 | Boubez .................. H04L 63/08 726/4 |

OTHER PUBLICATIONS

Projectliberty.org, "Liberty ID-WSF Security Mechanisms Core," (Research Paper), Liberty Alliance Project, Version v2.0, Oct. 3, 2006, 40 pages, available at http://projectliberty.org/liberty/content/download/893/6255/file/liberty-idwsf-security-mechanisms-core-v2.0.pdf.

R. Fielding et al., "Hypertext Transfer Protocol—HTTP/1.1." Jun. 1999, Network Working Group, Request for Comments: 2616 (RFC2616), <https://tools.ietf.org/pdf/rfc2616.pdf>.

Scott Seely, "Understanding WS-Security," Oct. 2002, <https://msdn.microsoft.com/en-us/library/ms977327.aspx>.

T. Bearers-Lee et al., "Uniform Resource Locators (URL)," Dec. 1994, Network Working Group, Request for Comments: 1738 (RFC1738), <https://tools.ietf.org/pdf/rfc1738.pdf>.

T. Dierks et al., "The TLS Protocol, Version 1.0," Jan. 1999, Network Working Group, Request for Comments: 2246 (RFC2246), <https://tools.ietf.org/pdf/rfc2246.pdf>.

Wikipedia, "WS-Security," May 5, 2014, <https://en.wikipedia.org/w/index.php?title=WS-Security&oldid=607207411>.

X500Standard.com, "X509: Public-key certificates," Jun. 28, 2009, <http://www.x500standard.com/index.php?n=X509.X509PKC?action=print>.

* cited by examiner

SERVICE REQUEST MODIFICATION

BACKGROUND

In a web service framework, a computing device (service requester) may invoke a software application hosted on a remote computing device (service provider) over a network, such as the Internet, via a service request. For example, a service requester may invoke an application hosted on a service provider to perform credit card payment processing. As another example, a service requester may invoke an application on a service provider to receive stock quotes.

BRIEF DESCRIPTION OF THE DRAWINGS

Some examples of the present application are described with respect to the following figures.

DETAILED DESCRIPTION

As described above, in a web service framework, a service requester may invoke a software application hosted on a service provider over the Internet via a service request. Prior to granting the service request, the service provider may perform an authentication process with the service requester to verify that the service requester is a trusted service requester. However, the service provider does not learn the identity of the service requester from the authentication process. Thus, the service provider cannot offer differentiated services to different service requesters based on identities of the different service requesters.

Examples described herein provide a gateway to forward client certificate information of a service requester to a web service logic layer of a service provider so that the web service logic layer may offer a particular level of service to the service requester based on an identity of the service requester. For example, a service requester may establish a connection with a gateway of a service provider via a cryptographic protocol, such as the secure sockets layer protocol. The gateway may receive client certificate information from the service requester during the process of establishing the connection. The gateway may determine a trust state of the service requester based on the client certificate information.

When the gateway receives a service request from the service requester, the gateway may modify the service request by inserting the trust state and client certificate information into a header portion of the service request. The gateway may forward the modified service request to a web service logic layer of the service provider. Based on the client certificate information, the web service logic layer may learn of the identity of the service requester. Thus, the web service logic layer may determine a level of service that is to be provided to the service requester. In this manner, examples described herein may enable a service provider to offer different levels of service to different service requesters.

Figure 1:
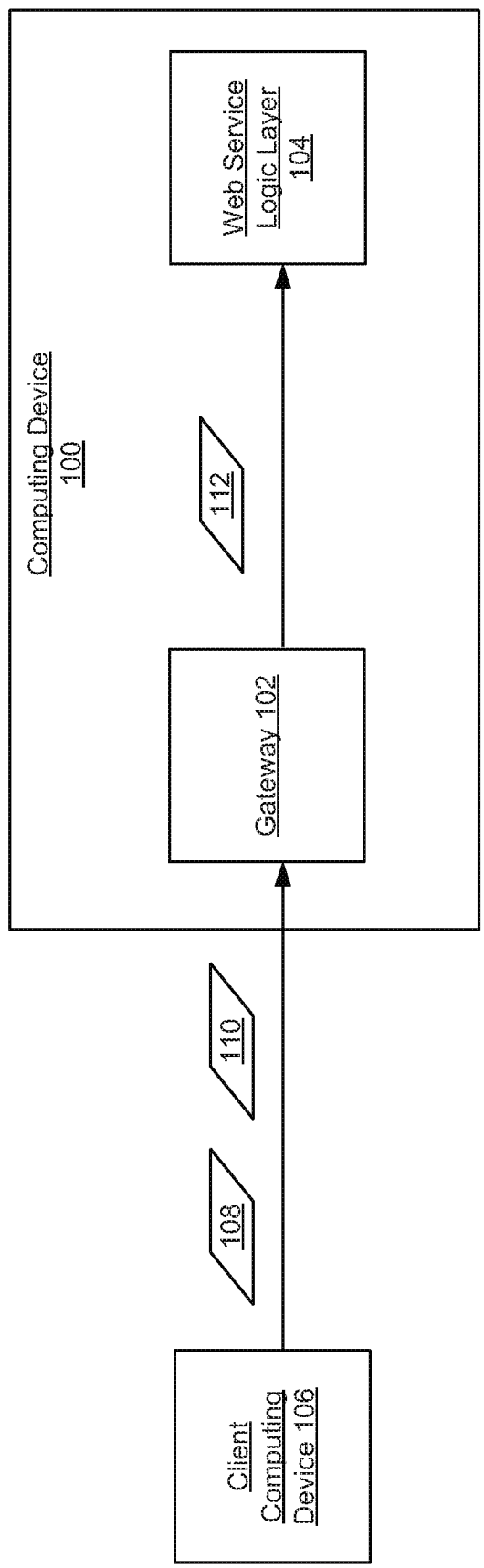
FIG. 1 is a block diagram of a computing device to provide a web service to another computing device based on a modified service request, according to an example.

Referring now to the figures, FIG. 1 is a block diagram of a computing device 100 to provide a web service to a client computing device based on a modified service request, according to an example. As used herein, web service may be any type of processor executable instructions stored in a computing device that can be invoked over a network, such as the Internet, a local area network, a wide area network, etc., by another computing device.

Computing device 100 may be, for example, a smartphone, a tablet computing device, a notebook computing device, a server computing device, an electronic book reader, a desktop computing device, an all-in-one system, or any other electronic device suitable for providing a web service to another computing device. Thus, computing device 100 may be a service provider. Computing device 100 may include a gateway 102 and a web service logic layer 104. Gateway 102 may be component of computing device 100 to insert client certificate information and/or trust state of a client computing device 106 into a service request from the client computing device. Web service logic layer 104 may be a component of computing device 100 to provide a web service to the client computing device 106. Gateway 102 and web service logic layer 104 may be implemented using processor executable instructions.

During operation, a client computing device 106 (a service requester) may transmit client certificate information 108 to gateway 102 as part of a handshake process to establish a connection with gateway 102. Client computing device 106 may be, for example, a smartphone, a tablet computing devices, a notebook computing device, a desktop computing device, an electronic book reader, an all-in-one system or any other electronic device suitable for requesting a web service from another computing device.

Gateway 102 may determine a trust state of client computing device 106 based on client certificate information 108. Client computing device 106 may transmit a service request 110 to request a web service from computing device 100. In response to receiving service request 110, gateway 102 generates a modified service request 112 by modifying service request 110. Gateway 102 may modify service request 110 by inserting client certificate information 108 and the trust state into service request 110. Gateway 102 may forward modified service request 112 to web service logic layer 104. Based on modified service request 112, web service logic layer 104 may determine a level of service associated with client computing device 106.

Figure 2:
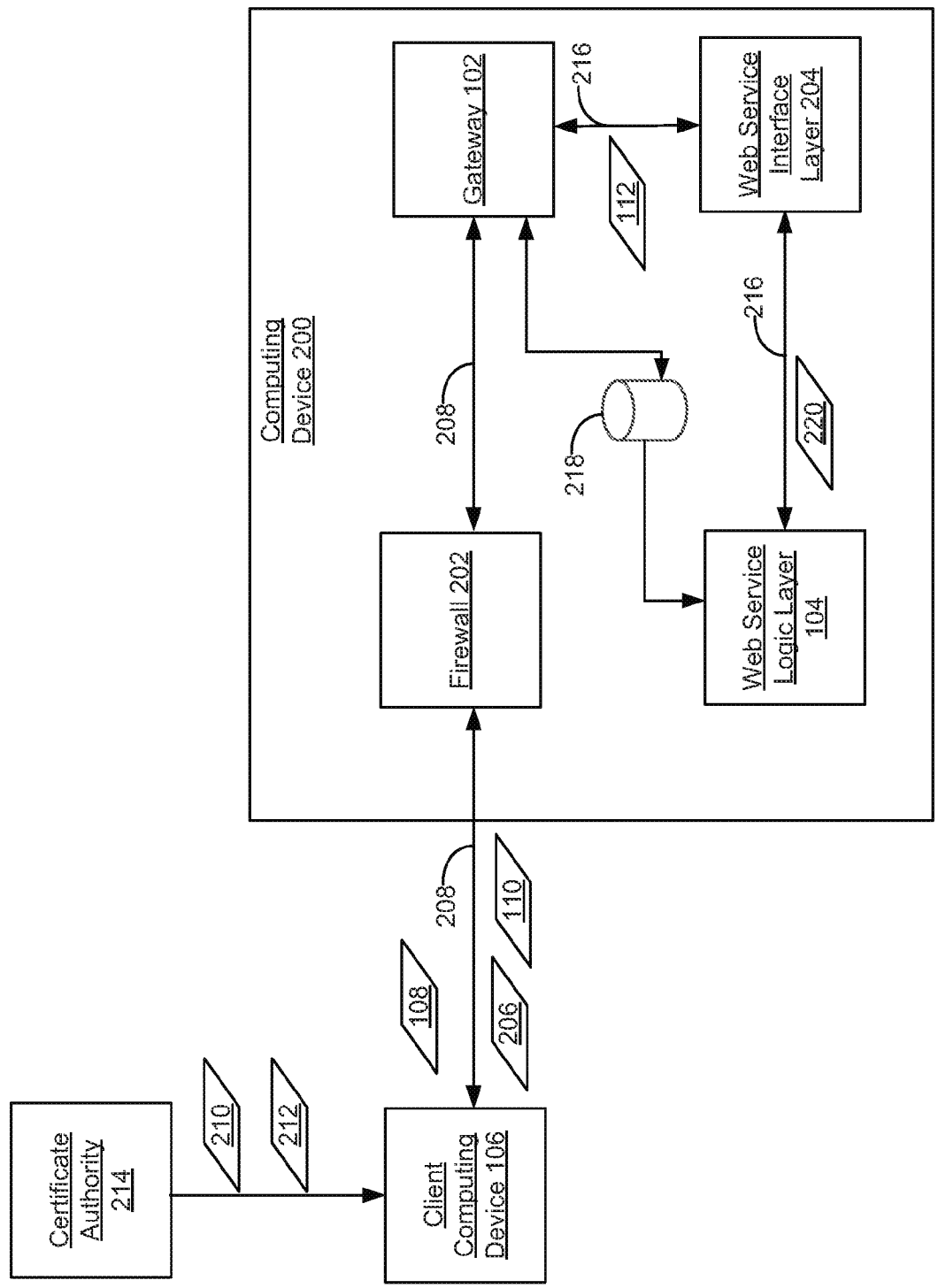
FIG. 2 is a block diagram of a computing device to provide a web service to another computing device based on a modified service request, according to another example.

FIG. 2 is a block diagram of a computing device 200 to provide a web service to another computing device based on a modified service request, according to another example. Computing device 200 may be similar to computing device 100 of FIG. 1. Computing device 200 may include a firewall 202, gateway 102, a web service interface layer 204, and web service logic layer 104. Firewall 202 may be a component of computing device 200 to filter incoming connection requests from client computing devices (e.g., client computing device 106) based on at least one forwarding criterion. Web service interface layer 204 may be a component of computing device 200 to translate or convert a service request from a first format to a second format that is used by web service logic layer 104. For example, web service interface layer 204 may translate a service request from a markup language format to an internal native computing device language format, such as C++ or JAVA.

Firewall 202 and web service interface layer 204 may be implemented using processor executable instructions.

During operation, client computing device 106 may transmit a connection request 206 to gateway 102 to establish a connection for receiving a web service from computing device 200. Client computing device 106 may generate connection request 206 using a web service uniform resource locator (URL) that is provided to client computing device 106 via an out-of-band mechanism (e.g., a separate connection).

Firewall 202 may process incoming connection requests destined for gateway 102 to filter out malicious or erroneous connection requests and to accept connection requests for a web service. Thus, firewall 202 may protect other components of computing device 200, such as gateway 102, web service logic layer 104, etc., from being directly accessed. Firewall 202 may filter incoming connection requests based on at least one forwarding criterion. For example, firewall 202 may accept incoming connection requests transmitted via a particular network port. Firewall 202 may deny other incoming connection requests transmitted via a different network port by dropping the incoming connection requests.

In response to a determination that connection request 206 satisfies a forwarding criterion, firewall 202 may forward connection request 206 to gateway 102. In response to receiving connection request 206 at gateway 102, gateway 102 may establish a first connection 208 with client computing device 106 via a cryptographic protocol, such as secure sockets layer (SSL) protocol, transport layer security (TLS) protocol, etc. In some examples, first connection 208 may be a connection compliant with hypertext transfer protocol (HTTP).

To establish first connection 208 using the particular network port, gateway 102 and client computing device 106 may engage in a handshake process to exchange credentials. Client computing device 106 may transmit client certificate information 108 to gateway 102. Client certificate information 108 may include a copy of a client certificate 210, a copy of a certificate authority (CA) certificate 212 that signed client certificate 210, or a combination thereof. Client computing device 106 may receive client certificate 210 and/or CA certificate 212 from a certificate authority 214. Client certificate 210 and/or CA certificate 212 may be used to authenticate client computing device 106.

In response to receiving client certificate information 108, gateway 102 may cache client certificate information 108 or generate a fingerprint of client certificate information 108, such as a hash of client certificate information 108. Gateway 102 may associate first connection 208 with client certificate information 108 or the fingerprint. In addition, gateway 102 may determine a trust state of client computing device 106 based on client certificate information 108. For example, gateway 102 may compare client certificate information 108 to a known trusted service requester information database 218. The trust state may include a trusted service requester and an untrusted service requester. Gateway 102 may determine client computing device 106 as a trusted service requester when client certificate 210 is signed by a CA trusted by computing device 200, such as CA 214, as indicated in known trusted service requester information database 218. Gateway 102 may determine client computing device 106 as an untrusted service requester when client certificate 210 is not signed by a CA 214 trusted by computing device 200, such as an unverified CA, as indicated in known trusted service requester information database 218. Gateway 102 may determine whether CA 214 is a trusted CA based on CA certificate 212 as indicated in known trusted service requester information database 218.

In response to establishing first connection 208 with gateway 102, client computing device 106 may transmit service request 110 to gateway 102 via first connection 208. Service request 110 may indicate the type of web service that client computing device 106 is requesting. Service request 110 may be a service request compliant with HTTP. In response to receiving service request 110, gateway 102 may generate modified service request 112 based on service request 110.

To generate modified service request 112, gateway 102 may insert client certificate information 108 and/or the trust state into a header portion of service request 110, such as a HTTP header portion, as cookies. In some examples, gateway 102 may insert the fingerprint of client certificate information 108 and/or the trust state into the header portion of service request 110 as cookies. Gateway 102 may also detect potential malicious service requests, such as a computer virus, by examining cookies included in the header portion. For example, gateway 102 may remove cookies in the header portion that contains the same cookie names as cookies used by gateway 102. Cookies that have the same cookie names as the cookies used by gateway 102 may indicate that the service request is trying to deceive web service logic layer 104. However, gateway 102 may not modify the remaining data of service request 110. Thus, modified service request 112 may include a header portion containing client certificate information 108 or the fingerprint of client certificate information 108 and the remaining data of service request 110.

Gateway 102 may forward modified service request 112 to web service logic layer 104 via web service interface layer 204 in a second connection 216. Gateway 102 may use a different network port to establish second connection 216 than the particular network port used to establish first connection 208. In response to receiving modified service request 112, web service interface layer 204 may convert modified service request 112 from a first format to a second format that is used by web service logic layer 104. For example, web service interface layer 204 may convert modified service request 112 from a markup language, such as Extensible Markup Language, to an internal native computing device language format, such as C++ or JAVA. Web service interface layer 204 may forward the converted, modified service request 112 to web service logic layer 104.

Web service logic layer 104 may determine a level of service associated with client computing device 106 based on the converted modified service request 112 and provide a web service to client computing device 106 based on the level of service and the web service requested. For example, when the converted modified service request 112 indicates that client computing device 106 is a trusted service requester, web service logic layer 104 may determine the identity of client computing device 106 based on client certificate information 108 in the header portion of modified service request 112. Web service logic layer 104 may determine the level of service by identifying rights and/or privileges of the identity stored in known trusted service requester information database 218.

Thus, web service logic layer 104 may provide differentiated levels of service to different client computing devices that are trusted service requesters based on identities of the different client computing devices. For example, a first client computing device may have the rights to modify both an account user name and a password while a second client computing device may have the rights to modify the password, but not the user account name.

After identifying the rights and/or privileges of client computing device 106, web service logic layer 104 may provide a web service to client computing device 106 based on the web service requested and based on the identified rights and/or privileges. For example, web service logic layer 104 may invoke particular processor executable instructions based on the web service requested and based on the identified rights and/or privileges to generate a response 220. Response 220 may be data requested by client computing device 106. Web service logic layer 104 may forward response 220 to gateway 102 via web service interface layer 204. Gateway 102 may forward response 220 to client computing device 106 via firewall 202.

When the converted modified service request 112 indicates that client computing device 106 is an untrusted service requester, in some examples, web service logic layer 104 may provide a reduced level of service to client computing device 106. Web service logic layer 104 may determine the reduced level of service using known trusted service requester information database 218. For example, client computing device 106 may request a web service to modify account information, when client computing device 106 is an untrusted service requester, web service logic layer 104 may display the account information instead. However, when client computing device 106 is a trusted service requester, web service logic layer 104 may grant the request to modify the account information.

In some examples, in response to a determination that client computing device 106 is an untrusted service requester, web service logic layer 104 may request client computing device 106 to supply additional credentials, such as a user name and a password, to authenticate client computing device 106. When client computing device 106 is authenticated, web service logic layer 104 may add client certificate information 108 to known trusted service requester information database 218 as a trusted service requester. Web service logic layer 104 may also update gateway 102 so that gateway 102 may recognize client computing device 106 as a trusted service requester for subsequent web service requests. Thus, when client computing device 106 requests a web service subsequently, client computing device 106 may be recognized as a trusted service requester and receive a higher level of service as compared to a level of service for an untrusted service requester.

Figure 3:
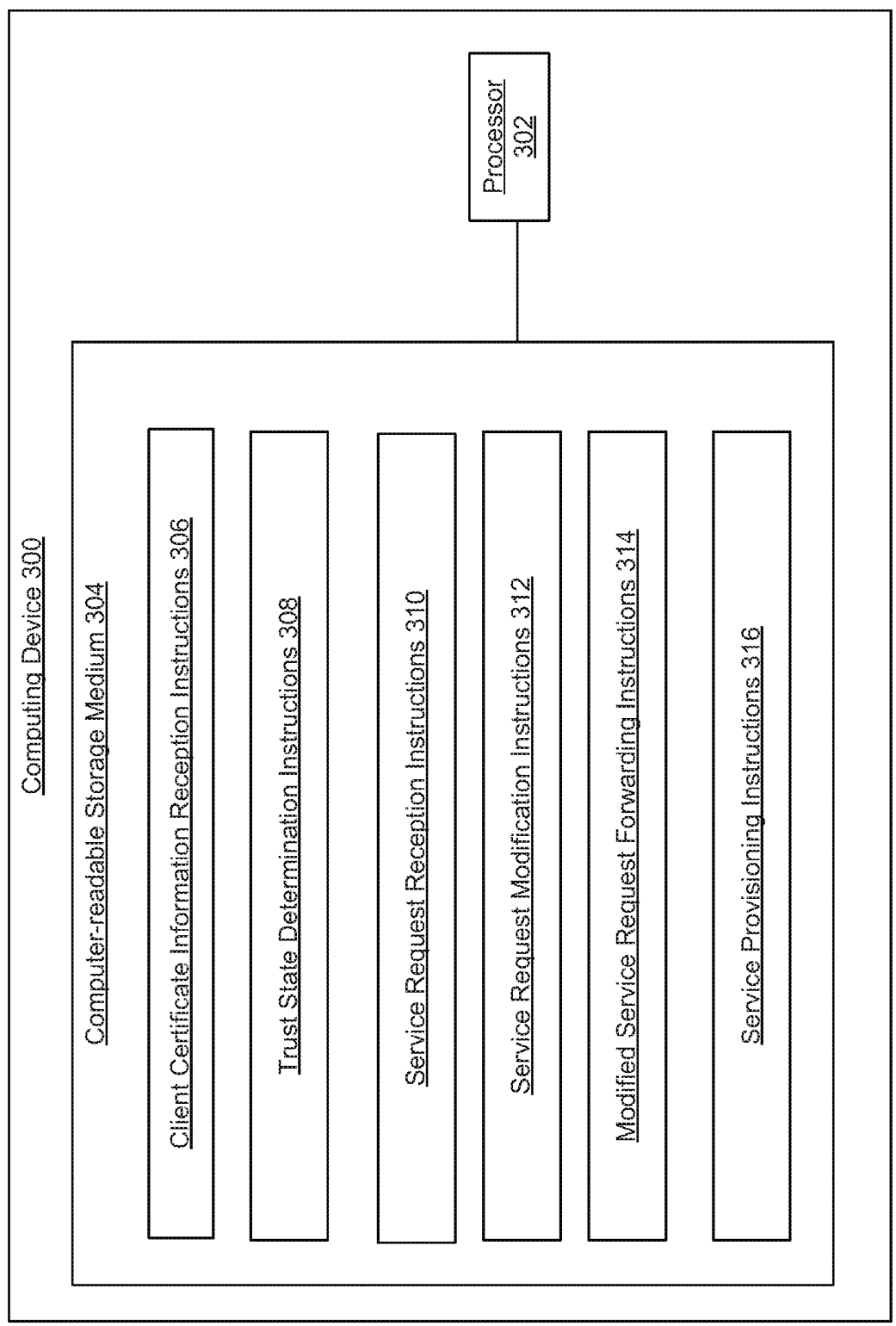
FIG. 3 is a block diagram of a computing device to provide a web service to another computing device based on a modified service request, according to another example.

FIG. 3 is a block diagram of a computing device 300 to provide a web service to another computing device based on a modified service request, according to another example. Computing device 300 may be similar to computing device 100 of FIG. 1 and/or computing device 200 of FIG. 2. Computing device 300 may include a processor 302 and a computer-readable storage medium 304.

Processor 302 may be a central processing unit (CPU), a semiconductor-based microprocessor, and/or other hardware devices suitable for retrieval and execution of instructions stored in computer-readable storage medium 304. Processor 302 may fetch, decode, and execute instructions 306-316 to control a process of providing a web service to a client computing device, such as client computing device 106 of FIG. 1, based on an identity of the client computing device. As an alternative or in addition to retrieving and executing instructions, processor 302 may include at least one electronic circuit that includes electronic components for performing the functionality of instructions 306, 308, 310, 312, 314, 316, or a combination thereof.

Computer-readable storage medium 304 may be any electronic, magnetic, optical, or other physical storage device that contains or stores executable instructions. Thus, computer-readable storage medium 304 may be, for example, Random Access Memory (RAM), an Electrically Erasable Programmable Read-Only Memory (EEPROM), a storage device, an optical disc, etc. In some examples, computer-readable storage medium 304 may be a non-transitory storage medium, where the term "non-transitory" does not encompass transitory propagating signals. As described in detail below, computer-readable storage medium 304 may be encoded with a series of processor executable instructions 306-316 for providing a web service to a client computing device based on an identity of the client computing device.

Client certificate information reception instructions 306 may instruct processor 302 to receive client certificate information from a client computing device. For example, referring to FIG. 2, gateway 102 may receive client certificate information 108 from client computing device 106. Trust state determination instructions 308 may determine a trust state of a client computing device. For example, referring to FIG. 2, gateway 102 may determine a trust state of client computing device 106 based on client certificate information 108.

Service request reception instructions 310 may instruct processor 302 to receive a web service request from a client computing device. For example, referring to FIG. 2, gateway 102 may receive service request 110 from client computing device 106. Service request modification instructions 312 may modify a service request. For example, referring to FIG. 2, gateway 102 may modify service request 110 by inserting client certificate information 108 and/or the trust state into a header portion of service request 110 as cookies.

Modified service request forwarding instructions 314 may forward a modified service request from a gateway to a web service logic layer. For example, referring to FIG. 2, gateway 102 may forward modified service request 112 to web service logic layer 104 via web service interface layer 204. Service provision instructions 316 may provide a differentiated level of service to a client computing device based on client certificate information of the client computing device. For example, referring to FIG. 2, when the converted modified service request 112 indicates that client computing device 106 is a trusted service requester, web service logic layer 104 may determine the identity of client computing device 106 based on client certificate information 108 in the header portion of modified service request 112. Web service logic layer 104 may determine the level of service by identifying rights and/or privileges of the identity stored in a known trusted service requester information database 218.

Figure 4:
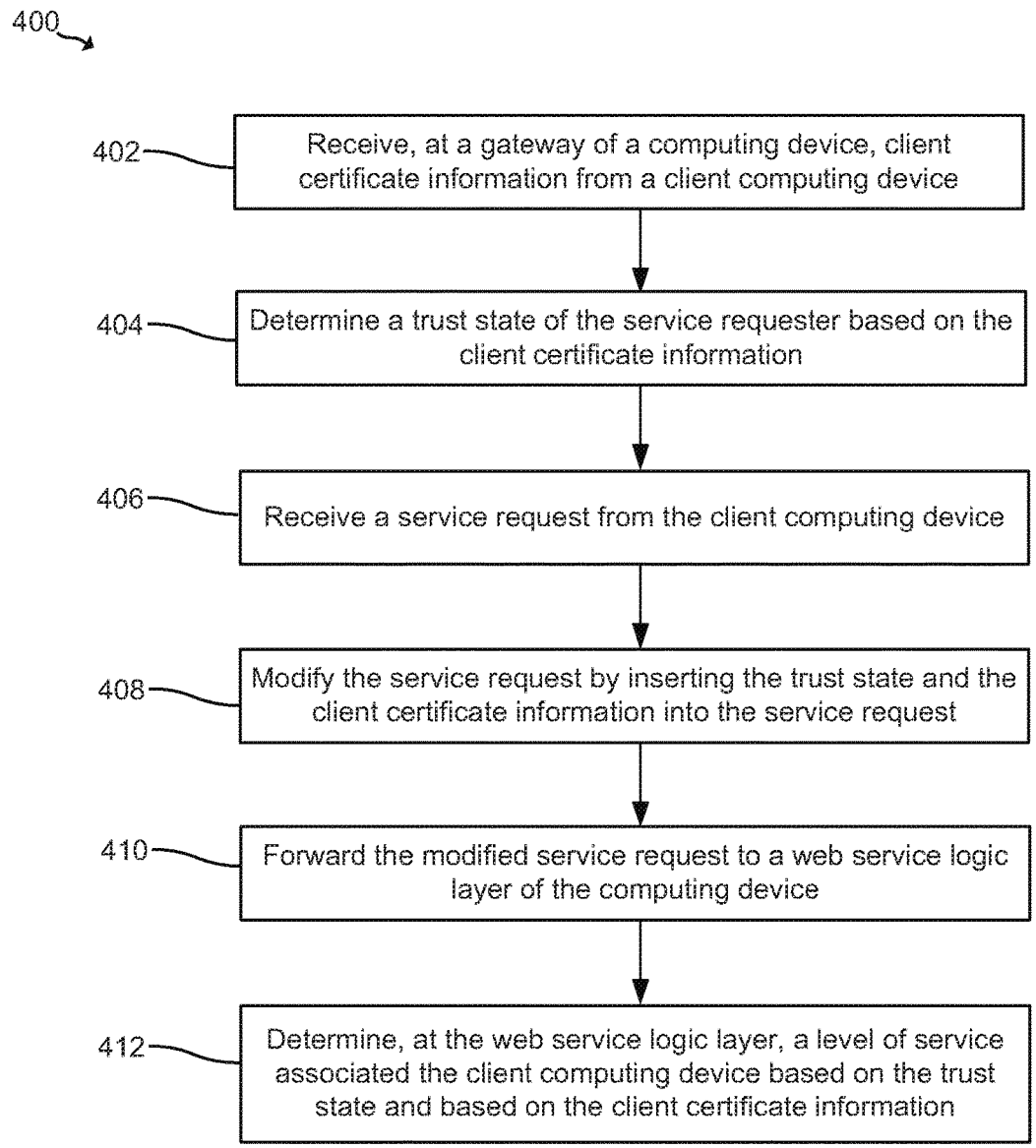
FIG. 4 is a flow chart illustrating a method of a computing device providing a web service to a client computing device based on a modified service request, according to an example.

FIG. 4 is a flow chart illustrating a method 400 of a computing device, such as computing device 100 of FIG. 1 or computing device 200 of FIG. 2, providing a web service to a client computing device based on a modified service request, according to an example. Method 400 may be implemented using computing device 100 of FIG. 1 and/or computing device 200 of FIG. 2. Method 400 includes receiving, at a gateway of a computing device, client certificate information from a client computing device, at 402. For example, referring to FIG. 2, gateway 102 may receive client certificate information 108 from client computing device 106.

Method 400 also includes determining a trust state of the service requester based on the client certificate information, at 404. For example, referring to FIG. 2, gateway 102 may determine a trust state of client computing device 106.

Method 400 further includes receiving a service request from the client computing device, at 406. For example, referring to FIG. 2, gateway 102 may receive service request 110 from client computing device 106.

Method 400 further includes modifying the service request by inserting the trust state and the client certificate information into the service request, at 408. For example, referring to FIG. 2, gateway 102 may modify service request 110 by inserting client certificate information 108 and/or the trust state into a header portion of service request 110 as cookies.

Method 400 further includes forwarding the modified service request to a web service logic layer of the computing device, at 410. For example, referring to FIG. 2, gateway 102 may forward modified service request 112 to web service logic layer 104. Method 400 further includes determining, at the web service logic layer, a level of service associated the client computing device based on the trust state and based on the client certificate information, at 412. For example, referring to FIG. 2, web service logic layer 104 may determine a level of service associated with client computing device 106 based on the converted modified service request 112 and provide a web service to client computing device 106 based on the level of service and the web service requested.

According to the foregoing, examples disclosed herein enable a computing device to provide a web service based on an identity of a client computing device that requests the web service. A gateway of the computing device may modify a head portion of a service request by inserting client certificate information and/or trust state of the client computing device into the header portion. The gateway may forward the modified service request to a web service logic layer of the computing device. The web service logic layer may learn of the identity of the client computing device using the client certificate information. Thus, the web service logic layer may provide a differentiated level of service to the client computing device based on the identity of the client computing device.

The use of "comprising", "including" or "having" are synonymous and variations thereof herein are meant to be inclusive or open-ended and do not exclude additional unrecited elements or method steps.

What is claimed is:

1. An apparatus comprising:
a processor; and
a non-transitory computer-readable storage medium comprising instructions executable by the processor to implement a gateway to:
establish a connection with a client computing device via a cryptographic protocol;
receive client certificate information from the client computing device;
receive a service request from the client computing device via the connection; and
generate a modified service request based on the service request and including the received client certificate information or a fingerprint of the client certificate information; and
wherein the computer-readable storage medium comprises instructions executable by the processor to implement a web service logic layer to:
receive the modified service request;
determine a level of service associated with the client computing device, from among a plurality of different levels of service, based on the client certificate information or the fingerprint of the client certificate information included in the modified service request; and
provide a web service to the client computing device with the level of service determined based on the client certificate information or the fingerprint of the client certificate information included in the modified service request.

2. The apparatus of claim 1, further comprising:
wherein the computer-readable storage medium comprises instructions executable by the processor to implement a firewall connected to the gateway to:
receive a connection request from the client computing device; and
forward the connection request to the gateway in response to a determination that the connection request matches a forwarding criterion; and
wherein the computer-readable storage medium comprises instructions executable by the processor to implement a web service interface layer connected to the gateway to:
receive the modified service request;
convert the modified service request from a first format to a second format; and
forward the converted modified service request to the web service logic layer.

3. The apparatus of claim 2, wherein the instructions executable to implement the gateway comprise instructions executable to:
establish the connection via a first network port;
establish a second connection with the web service interface layer via a second network port; and
forward the modified service request to the web service interface layer via the second connection.

4. The apparatus of claim 1, wherein the instructions executable to implement the gateway comprise instructions executable to:
determine a trust state of the client computing device based on the client certificate information.

5. The apparatus of claim 4, wherein the instructions executable to implement the gateway comprise instructions executable to modify the service request, including inserting the trust state and one of the client certificate information or the client fingerprint into the service request, to generate the modified service request.

6. The apparatus of claim 5, wherein the instructions to implement the web service logic layer comprise instructions executable to, when the trust state indicates that the client computing device is a trusted service requester, provide a first level of service to the client computing device, and when the trust state indicates that the client computing device is an untrusted service requester, provide a second level of service to the client computing device that is different from the first level of service.

7. The apparatus of claim 1, wherein the cryptographic protocol comprises at least one of a transport layer security protocol or a secure sockets layer protocol.

8. A method comprising:
receiving, at a gateway of a computing device, client certificate information from a client computing device;
receiving a service request from the client computing device;
modifying the service request, including inserting the client certificate information or a fingerprint of the client certificate information into the service request;
forwarding the modified service request to a web service logic layer of the computing device;

determining, at the web service logic layer, a level of service associated with the client computing device, from among a plurality of different levels of service, based on the client certificate information or the fingerprint of the client certificate information included in the modified service request; and provide a web service to the client computing device with the level of service determined based on the client certificate information or the fingerprint of the client certificate information included in the modified service request.

9. The method of claim 8, wherein modifying the service request further includes removing a first cookie in a hypertext transfer protocol (HTTP) header portion of the service request that contains the same name as a second cookie used by the gateway.

10. The method of claim 8, further comprising:
establishing, at the gateway, a first connection with the client computing device via a first network port; and
establishing, at the gateway, a second connection with the web service logic layer via a second network port, wherein the modified service request is forwarded via the second connection.

11. The method of claim 8, wherein the level of service is determined via a known trusted service requester information database.

12. The method of claim 8, further comprising:
determining a trust state of the client computing device based on the client certificate information.

13. The method of claim 12, wherein modifying the service request further comprises:
inserting the trust state and into the service request.

14. A non-transitory computer-readable storage medium comprising instructions that when executed by a processor of a computing device cause the computing device to:
receive, at a gateway of the computing device, client certificate information from a client computing device;
receive a service request from the client computing device;
modify the service request, including inserting the client certificate information or a fingerprint of the client certificate information into the service request;
forward the modified service request to a web service logic layer of the computing device;
provide, via the web service logic layer, a first level of service to the client computing device in response to a first determination by the web service logic layer based on the client certificate information or the fingerprint of the client certificate information included in the modified service request; and
provide, via the web service logic layer, a second level of service to the client computing device in response to a second determination by the web service logic layer based on the client certificate information or the fingerprint of the client certificate information included in the modified service request.

15. The non-transitory computer-readable storage medium of claim 14, wherein the second level of service corresponds to requesting a user name and a password from the client computing device to authenticate the client computing device.

16. The non-transitory computer-readable storage medium of claim 14, wherein the second level of service corresponds to a reduced level of service as compared to the first level of service.

17. The non-transitory computer-readable storage medium of claim 14, wherein the client certificate information includes a copy of a client certificate of the client computing device, a copy of a certificate authority certificate that signed the client certificate, or a combination thereof.

18. The non-transitory computer-readable storage medium of claim 14, wherein the first level of service is determined via a known trusted service requester information database.

19. The non-transitory computer-readable storage medium of claim 14, wherein the instructions comprise instructions executable to:
determine a trust state of the client computing device based on the client certificate information.

20. The non-transitory computer-readable storage medium of claim 19, wherein the instructions to modifying the service request comprise instructions to:
insert the trust state and into the service request.

* * * * *